J. F. DURYEA & W. M. REMINGTON.
CLUTCH MECHANISM.
APPLICATION FILED JULY 25, 1908.
920,841.
Patented May 4, 1909.
2 SHEETS—SHEET 1.
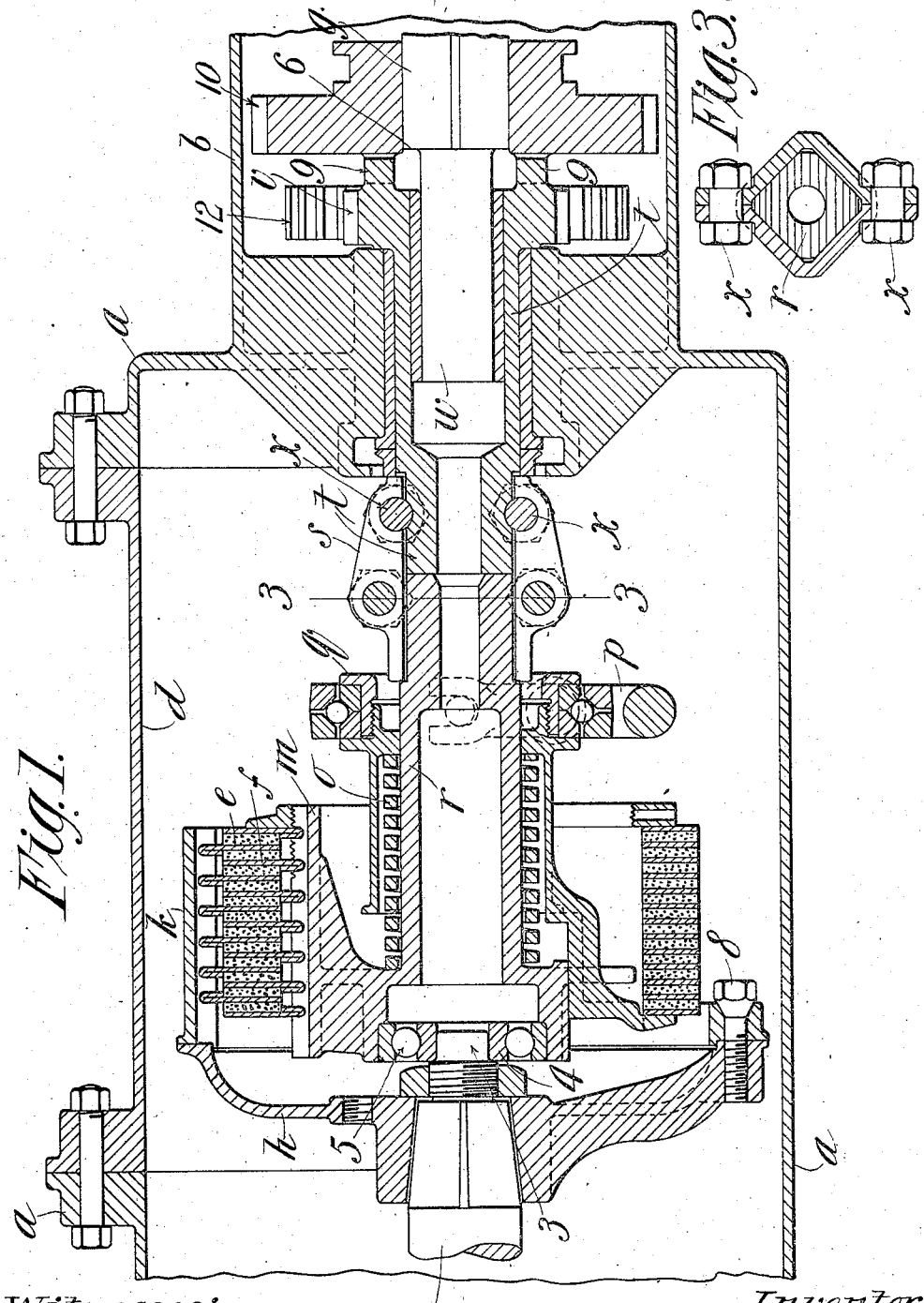
Witnesses:
H. L. Sprague
H. W. Bowen
Inventors,
James Frank Duryea
William M. Remington
by Chapin Leo
Attorneys.

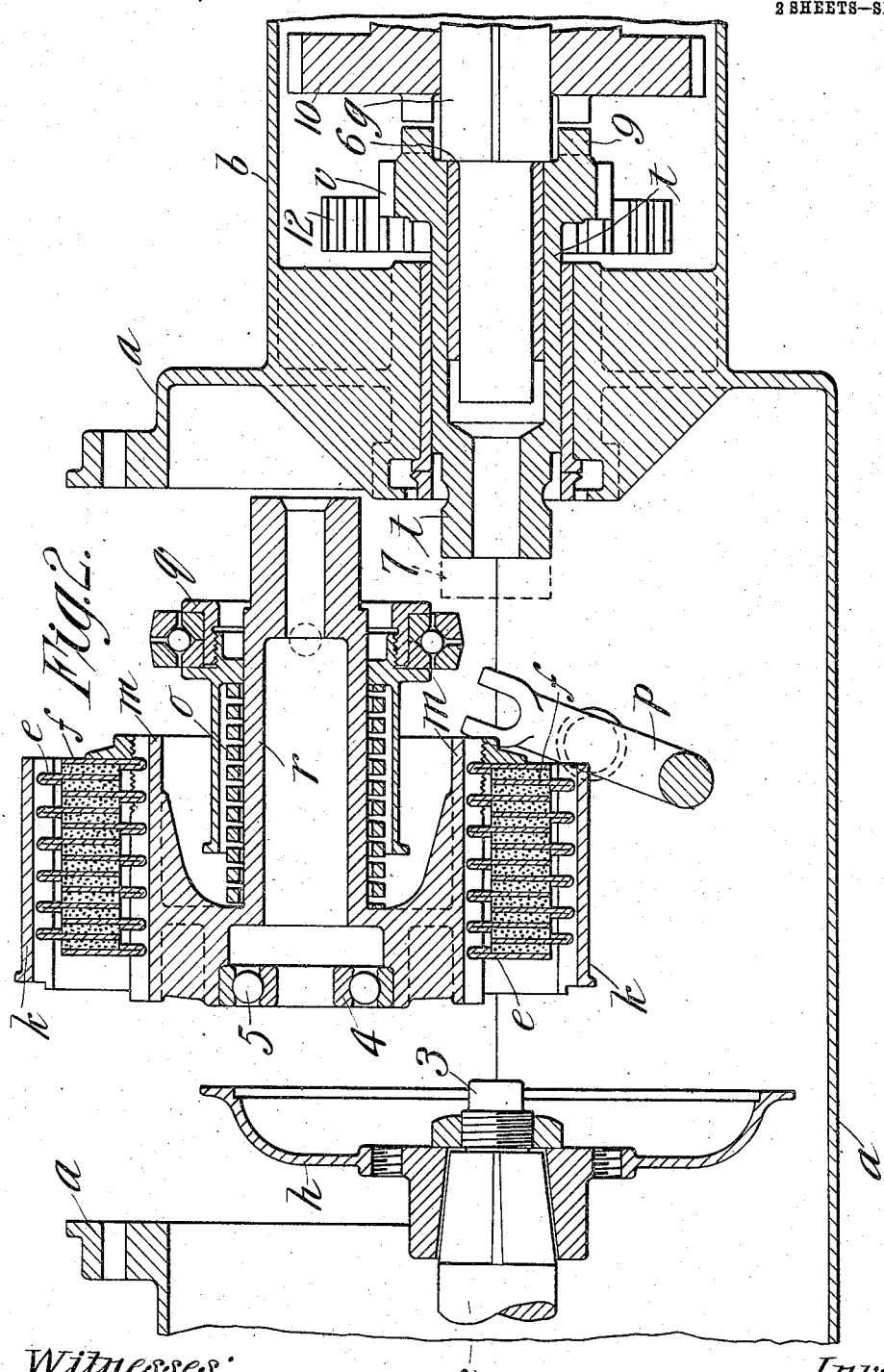

UNITED STATES PATENT OFFICE.

JAMES FRANK DURYEA AND WILLIAM M. REMINGTON, OF SPRINGFIELD, MASSACHUSETTS, ASSIGNORS TO STEVENS-DURYEA COMPANY, OF CHICOPEE FALLS, MASSACHUSETTS, A CORPORATION.

CLUTCH MECHANISM.

No. 920,841.  Specification of Letters Patent.  Patented May 4, 1909.

Application filed July 25, 1908. Serial No. 445,407.

*To all whom it may concern.*

Be it known that we, JAMES FRANK DURYEA and WILLIAM M. REMINGTON, citizens of the United States of America, residing at Springfield, in the county of Hampden and State of Massachusetts, have invented new and useful Improvements in Clutch Mechanism, of which the following is a specification.

This invention relates broadly, to power transmission devices, and specifically to a clutch construction located between a driving and a driven-shaft, the object of the invention being to provide a clutch construction which may be easily removed through an opening in the casing, in which the clutch is housed, all as fully described in the following specification and pointed out clearly in the claims appended thereto, the invention being clearly illustrated in the accompanying drawings, in which,—

Figure 1 is a vertical section of a clutch mechanism embodying the invention, the clutch casing being shown with the opening therein closed, and a portion of the transmission casing being also shown. Fig. 2 is a view similar to Fig. 1, the clutch mechanism being shown moved out of operative relation to the driving and driven shafts ready to be taken through the opening in the casing. Fig. 3 is a sectional view on line 3—3, Fig. 1, showing the cross sectional form of a member of the transmission and through which movement is imparted to the driving-shaft.

Referring to these drawings, $a$ indicates the casing inclosing the clutch mechanism; $b$ indicating a continuation of said casing in which the transmission mechanism is inclosed,—only a part of which is shown.

The driving-shaft is indicated by $c$ and may be considered as one end of a crank-shaft which extends into the clutch-casing which is provided with an opening in the upper side thereof normally closed by a part $d$ of the casing which is removable, and through which the clutch mechanism, as a whole, may be removed, it being very desirable at times to remove the clutch for the purpose of replacing certain of the disks $f$ which may be worn, the clutch shown herein being of the well known disk type. However, the invention is not confined to a construction embodying any specific type of clutch though perhaps more particularly applicable to one in which this compact disk clutch is used. The clutch mechanism serves as a driving connection between the driving-shaft $c$ and the driven-shaft $g$ located in the transmission casing $b$.

Briefly, the clutch mechanism shown herein is constructed as follows: A circular head $h$ is fixed on the end of the driving-shaft $c$, the disks $e$ and $f$ being carried in closely assembled relation between a flange $k$ on the head $h$ with which certain of the disks, as $e$, engage, and a circular head $m$ with which certain other disks, as $f$, engage in such manner that the disks $e$ will rotate with the head $h$; and if these disks be clamped by compression between the disks $f$, the latter will rotate the head $m$. This compression is effected by the expansion of the spring $o$ which may be compressed by means of a fork $p$ engaging a member $q$ which is slidable on the hub $r$ of the head $m$, the fork $p$ being operated by a foot treadle. In its general construction, this clutch is so well known as to require no further description, except to state that the flange $k$ is bolted to the head $h$ to permit the separation of these parts when it is desired to remove the clutch, the opposite end of the clutch mechanism being supported by means of a coupling $s$ which embraces the end of the hub $r$, and the end of the hub $t$ of a gear $v$ in the transmission casing, which hub rotates on the end $w$ of the driven shaft $g$, and has a sliding movement thereon, and in effect constitutes a slidable extension of the shaft $g$. The end of the hub $r$ that is engaged by the coupling $s$, as well as the end of the hub $t$, are squared, and to prevent endwise movement of one relative to the other in the coupling, two of the bolts $x$, which secure the two parts of the coupling together, are fitted into grooves in the hub $t$, the cross sectional form of the hub at this point being shown in Fig. 3.

The clutch mechanism as a whole is centered on the driving-shaft $c$ by means of a projection 3 on the end of the latter on which the clutch is supported, preferably by a bearing-ring 4 running on the balls 5. The long hub $t$ of the gear $v$ has, as stated, a sliding movement in its bearing and on the end $w$ of the driven shaft, and preferably that end of the shaft $g$ on which this hub slides is of less diameter than the rest of the shaft, whereby a shoulder 6 is provided which constitutes a stop to limit the movement of the gear $v$, the side of the latter coming to a stop against said shoulder. The driven shaft therefore is practically made of two sections, the movable section sliding back with the transmission casing. The said endwise movement of the hub $t$, or movable section of the driven-shaft, is for the purpose of providing space enough between the end thereof and the contiguous end of the hub $r$, as indicated at 7, Fig. 2, in dotted lines, to permit the clutch mechanism to be shifted far enough toward the transmission casing to disengage it from the centering stud 3 on the driving-shaft, and thus permit its removal bodily through the opening in the top of the clutch casing heretofore referred to, it being understood, of course, that to effect such removal and disengagement from the stud 3, it is first necessary to remove bolts 8 which secure the flange $k$ to the head $h$,—only one of these bolts being shown in Fig. 1.

To transmit rotative movement to the driven-shaft $g$ from the driving-shaft through the medium of the clutch, the side of the gear $v$ is provided with jaws 9 with which like jaws on a gear 10, slidable on and rotatable with the shaft $g$, may engage, and when so engaged said shaft $g$ will be driven by a direct connection with the driving-shaft $c$. To rotate the driven-shaft $g$ at a different speed, connection may be made through the gear $v$ to another gear 12 on a shaft in the transmission casing parallel with the shaft $g$, there being other gears (not shown herein) both on the shaft $g$ and on said other shaft parallel therewith which may be moved into engagement one with the other, whereby rotative movement at variable speeds will be imparted to said shaft $g$ in a manner well known to any one skilled in this art. Therefore, to remove the clutch, the gear 10 must be out of clutching engagement with the gear $v$, the bolts $x$ of the coupling $s$ being then removed and the gear with its hub shifted endwise from the position shown in Fig. 1 to that shown in Fig. 2, and the bolts 8 having been removed to disengage the clutch mechanism from the head $h$, said mechanism may be shifted toward the rear end of the casing to disengage it from the centering stud 3 on the driving-shaft, whereupon it may be, as a whole, lifted out of the clutch casing, the cover $d$ of the opening in said casing having been removed.

The gear $v$ throughout the foregoing specification has been alluded to as having a hub $t$ but the description of the parts would be quite as accurate if the member $t$ had been referred to throughout the specification as a tubular sliding section of the transmission shaft carrying on one end thereof the gear $v$.

What we claim, is:—

1. The combination with a variable speed transmission device comprising a two-part driven shaft, one part of which rotates in a fixed plane, the other part being loosely and slidably mounted thereon, a gear fixed on said slidable part, a second gear rotatable with said first named part of the shaft and slidable on it into clutching engagement with said first named gear, of a driving-shaft in line with the driven shaft, and a clutch mechanism interposed between said shafts and having a driven and a driving element removably connected with said shafts respectively, said slidable part of the transmission shaft being movable away from its connection with the clutch mechanism to make room for the disengagement of the latter from the driving-shaft.

2. The combination with a driving-shaft and a driven-shaft constituting part of a variable speed transmission device, of a clutch mechanism located between and constituting a driving connection from one of said shafts to the other; means to removably connect one element of said clutch to the driving-shaft, and means to connect the second element of the clutch with the driven shaft, said means consisting of a gear constituting part of the transmission device revolubly and slidably mounted on the driven-shaft and provided with a long hub which is in effect an extension of the driven-shaft, and means to removably connect said gear hub to said second element of the clutch mechanism.

3. A driving and a driven-shaft in axial alinement, a clutch mechanism interposed between said shafts to transmit rotary movement from one to the other; means to removably attach the clutch to the driving-shaft; a gear on the driven-shaft provided with a clutch member, freely revoluble on said shaft and slidable thereon toward and from the clutch mechanism, another clutch member slidable on the driven-shaft and rotable therewith to engage the clutch member on the gear, whereby the driven-shaft may be rotated, and means to removably couple the gear to the clutch mechanism.

JAMES FRANK DURYEA.
WILLIAM M. REMINGTON.

Witnesses:
K. I. CLEMONS,
H. W. BOWEN.